United States Patent
Tribelhorn et al.

(10) Patent No.: US 7,892,395 B2
(45) Date of Patent: Feb. 22, 2011

(54) COMPOSITION USEFUL AS AN ADHESIVE FOR INSTALLING VEHICLE WINDOWS

(75) Inventors: Ulrich Tribelhorn, Ebikon (CH); Josef S. Bühler, Weesen (CH); Renate Herger Hassan, Obstalden (CH)

(73) Assignee: Dow Global Technologies Inc., Midland, MI (US)

( * ) Notice: Subject to any disclaimer, the term of this patent is extended or adjusted under 35 U.S.C. 154(b) by 635 days.

(21) Appl. No.: 11/824,984

(22) Filed: Jul. 3, 2007

(65) Prior Publication Data

US 2008/0149257 A1    Jun. 26, 2008

Related U.S. Application Data

(60) Provisional application No. 60/876,293, filed on Dec. 21, 2006.

(51) Int. Cl.
*B60J 1/00* (2006.01)
*E06B 3/00* (2006.01)
*E06B 5/00* (2006.01)
*E06B 7/00* (2006.01)
*C04B 37/00* (2006.01)
*B32B 7/12* (2006.01)
*C08G 18/08* (2006.01)
*C08L 75/00* (2006.01)

(52) U.S. Cl. .................. 156/325; 156/108; 156/327; 524/589

(58) Field of Classification Search ........... 156/108, 156/325, 327; 524/589
See application file for complete search history.

(56) References Cited

U.S. PATENT DOCUMENTS

| | | | |
|---|---|---|---|
| 3,707,521 A | 12/1972 | De Santis | |
| 3,779,794 A | 12/1973 | De Santis | |
| 4,525,511 A | 6/1985 | Kirby et al. | |
| 4,659,779 A | 4/1987 | Bagga et al. | |
| 4,739,019 A | 4/1988 | Schappert et al. | |
| 4,780,520 A | 10/1988 | Rizk et al. | |
| 4,824,888 A * | 4/1989 | Emmerling et al. | 524/199 |
| 4,828,755 A | 5/1989 | Kusumgar | |
| 5,073,601 A | 12/1991 | Mülhaupt et al. | |
| 5,162,457 A | 11/1992 | Hamsel | |
| 5,166,300 A | 11/1992 | Rumon | |
| 5,194,502 A | 3/1993 | Saito et al. | |
| 5,278,257 A | 1/1994 | Mülhaupt et al. | |
| 5,367,036 A | 11/1994 | Saito et al. | |
| 5,603,798 A | 2/1997 | Bhat | |
| 5,631,318 A | 5/1997 | Ito et al. | |
| 5,698,656 A | 12/1997 | Ohashi et al. | |
| 5,744,088 A | 4/1998 | Cuyper | |
| 5,747,581 A | 5/1998 | Proebster | |
| 5,852,137 A | 12/1998 | Hsieh et al. | |
| 5,922,809 A | 7/1999 | Bhat et al. | |
| 5,976,305 A | 11/1999 | Bhat et al. | |
| 6,015,475 A | 1/2000 | Hsieh et al. | |
| 6,133,398 A | 10/2000 | Bhat et al. | |
| 6,709,539 B2 | 3/2004 | Zhou | |
| 6,749,943 B1 | 6/2004 | Tangen et al. | |
| 6,767,959 B2 | 7/2004 | Bosshard et al. | |
| 6,776,869 B1 | 8/2004 | Schenkel | |
| 7,101,950 B2 | 9/2006 | Zhou et al. | |
| 2002/0100550 A1 | 8/2002 | Mahdi et al. | |
| 2004/0266899 A1 | 12/2004 | Muenz et al. | |
| 2005/0054764 A1 | 3/2005 | Zhou et al. | |
| 2005/0070634 A1 | 3/2005 | Lutz et al. | |
| 2005/0209401 A1 | 9/2005 | Lutz et al. | |
| 2006/0096694 A1 | 5/2006 | Zhou | |
| 2006/0205897 A1 | 9/2006 | Frick et al. | |
| 2006/0276601 A1 | 12/2006 | Lutz et al. | |
| 2006/0293489 A1 | 12/2006 | Zhou et al. | |

FOREIGN PATENT DOCUMENTS

| | | |
|---|---|---|
| CA | 215423 | 1/1996 |
| EP | 819749 | 1/1998 |
| WO | WO2005/019292 | 3/2005 |
| WO | WO2006/052505 | 5/2006 |

OTHER PUBLICATIONS

U.S. Appl. No. 60/899,284, Dow Case 65637, filed Feb. 2, 2007, Ziyan Wu et al., Adhesive Useful for Installing Vehicle Windows.

(Continued)

*Primary Examiner*—Philip C Tucker
*Assistant Examiner*—Michael N Orlando
(74) *Attorney, Agent, or Firm*—Dobrusin & Thennisch PC

(57) ABSTRACT

In one embodiment, the invention is an composition comprising: a) one or more isocyanate functional polyether polyurethane prepolymers; and b) one or more prepolymers of one or more polyisocyanates and one or more polyesters wherein the terminal groups on the polyester polyol polyurethane prepolymer are the residue of a monofunctional polyalkylene glycol (hereinafter capped polyester polyurethane prepolymer) or one or more polyester polyols which are capped with the residue of one or more monofunctional isocyanates (hereinafter isocyanate capped polyesters); wherein the composition is a low viscous paste at temperature of from about 40 to about 80° C. and is high viscous paste at a temperature of from about 40° C. or less. In a preferred embodiment the composition further comprises c) one or more catalysts for the reaction of isocyanate moieties with hydroxyl groups. In another embodiment the invention is a method of bonding two or more substrates together which comprise contacting the two or more substrates together with a composition according to this invention disposed along at least a portion of the area wherein the substrates are in contact wherein the composition is a low viscous paste. In a preferred embodiment the composition is heated to about 40° C. to about 80° C. and converted to a low viscous paste prior to contacting it with the one or more substrates.

18 Claims, No Drawings

OTHER PUBLICATIONS

EP Application Serial No. 04812885.2, Dow Case 63619, filed Jun. 1, 2004, Jeannine Fluekiger et al., Epoxy Adhesive Composition.

U.S. Appl. No. 11/818,431, Dow Case 63906B, filed Jun. 14, 2007, Lirong Zhou, High Modulus, Nonconductive Adhesive Useful for Installing Vehicle Windows.

U.S. Appl. No. 11/597,978, Dow Case 63619A-US, filed May 27, 2005, Andreas Lutz et al., Epoxy Adhesive Composition.

Database WPI Section Ch, Week, 199121, Derwent Publications Ltd., London, GB; AN 1991-151142, XP002307834 & JP 03043481 Raytheon Co., Feb. 25, 1991-Abstract.

JP2011616A, Jan. 16, 1990, Manufacture of Composition of Butadiene-Based Copolymer and Terminal Urethane Polymer and Bridging Product Thereof, Rorufu Miyuruhauputo et al., This is a family member of EP0338985, Abstract.

Sika Tack-ASAP, Technical Sheet, Jul. 2003, Sika Corporation.

* cited by examiner

COMPOSITION USEFUL AS AN ADHESIVE FOR INSTALLING VEHICLE WINDOWS

CLAIM OF PRIORITY

This application claims priority from U.S. Provisional application Ser. No. 60/876,293 filed Dec. 21, 2006.

FIELD OF INVENTION

The invention relates to a composition useful as an adhesive which is useful in bonding glass into vehicles and buildings. In another embodiment, the invention is a method of bonding two or more substrates together, wherein such substrates may include glass, buildings and vehicles.

BACKGROUND OF INVENTION

Adhesive compositions are used to affix (bond) glass (windows) into buildings and vehicles, see Rizk, U.S. Pat. No. 4,780,520; Bhat, U.S. Pat. No. 5,976,305; Hsieh et al., U.S. Pat. No. 6,015,475 and Zhou, U.S. Pat. No. 6,709,539, all incorporated herein by reference. In automobile factories windows are installed using robots and computer controlled processing. This facilitates the use of a variety of high performance adhesives used on a variety of automobiles, for instance nonconductive adhesives and high modulus adhesives. It is also difficult to formulate a high performance adhesive that does not sag, that is, lose the shape of the adhesive bead applied to the vehicle or the glass. Thus many commercial processes utilizing adhesives to bond windows into vehicles require the use of some means of fixturing the glass in place until the adhesive has enough strength to hold the window in place. The means of fixturing windows in place until the adhesive cures results in added cost. Thus it is desirable that the adhesive used to bond the glass in place be capable of holding the glass in place upon application of the adhesive.

Adhesives have been developed which provide good initial green strength that allows the adhesive to hold the glass in place without additional fixturing to hold the glass in place. This is achieved through the inclusion of crystalline thermoplastic polymers, such as polyesters, in the adhesive. These adhesives have hot melt properties that require that the adhesives to be melted and applied hot. As the adhesive cools the thermoplastic portion crystallizes and provides initial green strength to hold the glass in place, see Proebster, U.S. Pat. No. 5,747,581, incorporated herein by reference. The problem with these adhesives is that they cure too slow and do not provide enough green strength to prevent movement of glass. Also formulations disclosed in the reference require a relatively high amount of the thermoplastic component. High amounts of the thermoplastic material can negatively impact the physical properties of the cured adhesive.

What is needed is a composition which is useful as an adhesive for bonding glass into a structure which exhibits fast strength development and good long term properties and does not sag when applied.

SUMMARY OF INVENTION

In one embodiment, the invention is an composition comprising: a) one or more isocyanate functional polyether polyurethane prepolymers; and b) one or more prepolymers of one or more polyisocyanates and one or more polyester polyols wherein the terminal groups on the polyester polyol polyurethane prepolymer are the residue of a monofunctional polyalkylene glycol (hereinafter capped polyester polyurethane prepolymer) or one or more polyester polyols which are capped with the residue of one or more monofunctional isocyanates (hereinafter isocyanate capped polyesters); wherein the composition is a low viscous paste at temperature of from about 40 to about 80° C. and is high viscous paste at a temperature of from about 40° C. or less. In a preferred embodiment the composition further comprises c) one or more catalysts for the reaction of isocyanate moieties with hydroxyl groups. In a preferred embodiment, the composition is a low viscous paste at a temperature of from about 45 to about 70° C. and is a high viscous paste at a temperature of about 35° C. or below.

In another embodiment the invention is a method of bonding two or more substrates together which comprises contacting the two or more substrates together with a composition according to this invention disposed along at least a portion of the area wherein the substrates are in contact wherein the composition is a low viscous paste when applied. In a preferred embodiment the composition is heated to about 40° C. to about 80° C. and converted to a low viscous paste prior to contacting it with the one or more substrates.

The composition of the invention is useful as an adhesive to bond substrates together. A variety of substrates may be bonded together using the composition, for instance, plastics, glass, wood, ceramics, metal, coated substrates and the like. The compositions of the invention may be used to bond similar and dissimilar substrates together. The compositions are especially useful for bonding glass to other substrates such as vehicles and buildings. The compositions of the invention are also useful in bonding parts of modular components together, such as vehicle modular components. The glass can be bonded to coated and uncoated portions of vehicles. The adhesive demonstrates rapid strength development. The adhesive compositions of the invention demonstrate excellent sag resistance upon cooling due to the crystallization of the capped polyisocyanate-polyester based polyurethane prepolymer or isocyanate capped polyester polyurethanes. As compared to comparable adhesive compositions of the state of the art, in the inventive composition the polyester polyurethane prepolymer is miscible with the polyether polyurethane prepolymer in the molten state and crystallizes upon cooling as a coherent solid network within the polyether polyurethane liquid matrix.

DETAILED DESCRIPTION OF INVENTION

One or more as used herein means that at least one, or more than one, of the recited components may be used as disclosed. Nominal as used with respect to functionality means the theoretical functionality, generally this can be calculated from the stoichiometry of the ingredients used. Generally, the actual functionality is different due to imperfections in raw material, incomplete conversion of the reactants and formation of by-products. As used herein high viscous paste means a product, having a viscosity of greater than (>) 50,000 Pa s, preferably greater than (>) 100,000 Pa s, measured with a rheometer Bohlin CS, controlled strain mode and using a cone-plate system CP 4/20 at a shear rate of 1.075 ($s^{-1}$). As used herein low viscous paste means a product, having a viscosity of less than (<) 10,000 Pa s, preferably less than (<) 8000 Pa s, measured as described above.

The one or more isocyanate functional polyether polyol polyurethane prepolymers are present in sufficient quantity to provide adhesive character to the composition. The isocyanate functional polyether polyol polyurethane prepolymers are in the liquid state and provide a liquid matrix for the adhesive.

Such prepolymers have an average isocyanate functionality sufficient to allow the preparation of a crosslinked polyurethane upon cure and not so high that the polymers are unstable. Stability in this context means that the prepolymer or adhesive prepared from the prepolymer has a shelf life of at least 6 months at ambient temperatures, in that it does not demonstrate an increase in viscosity during such period which prevents its application or use. Preferable polyether polyurethane prepolymers are disclosed in Zhou, U.S. Patent Publication 2005/0054764 paragraphs 12 to 20 incorporated herein by reference.

The isocyanate functional polyether polyol polyurethane prepolymers are the reaction product of one or more polyisocyanates with a mixture of one or more polyether diols and one or more polyether triols wherein excess of polyisocyanate is present on an equivalents basis. Preferable polyisocyanates for use in preparing the prepolymers used in this invention include those disclosed in U.S. Pat. No. 5,922,809 at column 3, line 32 to column 4, line 24 incorporated herein by reference. Preferably, the polyisocyanate is an aromatic or cycloaliphatic polyisocyanate such as diphenylmethane-4,4'-diisocyanate, isophorone diisocyanate, tetramethylxylene diisocyanate, and is most preferably diphenylmethane-4,4'-diisocyanate. The diols and triols are generically referred to as polyols. Polyols useful in this invention are diols and triols corresponding to the polyols described in U.S. Pat. No. 5,922,809 at column 4, line 60 to column 5, line 50, incorporated herein by reference. Preferably, the polyols (diols and triols) are polyether polyols and more preferably polyoxyalkylene oxide polyols. Most preferred triols are ethylene oxide-capped polyols prepared by reacting glycerin with propylene oxide, followed by reacting the product with ethylene oxide. In one embodiment, the prepolymer also comprises a dispersion triol having dispersed therein particles of an organic based polymer. The preferable dispersion triols are disclosed in Zhou, U.S. Pat. No. 6,709,539 at column 4, line 13 to column 6, line 18, incorporated herein by reference.

The polyols are present in an amount sufficient to react with most of the isocyanate groups of the isocyanates leaving enough isocyanate groups to correspond with the desired free isocyanate content of the prepolymer. Preferably, the polyols are present in an amount of about 50 parts by weight or greater based on the prepolymer, more preferably about 65 parts by weight or greater and most preferably about 80 parts by weight or greater. Preferably, the polyols are present in an amount of about 90 parts by weight or less based on the prepolymer and most preferably about 85 parts by weight or less.

The isocyanate functional polyether polyol polyurethane prepolymers of the invention may further comprise a plasticizer. The plasticizers useful in the prepolymer are common plasticizers useful in polyurethane adhesive applications and well known to those skilled in the art. The plasticizer is present in an amount sufficient to disperse the prepolymer in the final adhesive composition. The plasticizer can be added to the adhesive either during preparation of the prepolymer or during compounding of the adhesive composition. Preferably, the plasticizer is present in about 1 parts by weight or greater of the prepolymer formulations (prepolymers plus plasticizer), more preferably about 5 parts by weight or greater and most preferably about 10 parts by weight or greater. Preferably, the plasticizer is present in about 50 parts by weight or less of the prepolymer formulation and more preferably about 40 parts by weight or less.

The isocyanate functional polyether polyol polyurethane prepolymer may be prepared by any suitable method, such as by reacting polyols with an excess over stoichiometry of one or more polyisocyanates under reaction conditions sufficient to form a prepolymer having isocyanate functionality. One method is disclosed in Hsieh, U.S. Pat. No. 5,852,137 at column 4, line 65 to column 5, line 12 incorporated herein by reference.

The isocyanate functional polyether polyol polyurethane prepolymers are present in the adhesive composition in an amount sufficient such that when the resulting adhesive cures substrates are bound together. Preferably, the isocyanate functional polyether polyol polyurethane prepolymers are present in an amount of about 30 parts by weight of the adhesive composition or greater, more preferably about 35 parts by weight or greater and most preferably about 40 parts by weight or greater. Preferably, the isocyanate functional polyol polyurethane prepolymers are present in an amount of about 60 parts by weight of the adhesive composition or less, more preferably about 55 parts by weight or less and even more preferably about 50 parts by weight or less.

In one embodiment the composition further comprises a polyester polyol polyurethane prepolymer (b) comprising the reaction product of one or more polyisocyanates and one or more polyester polyols which reaction product is further capped with one or more monofunctional polyalkylene glycols (hereinafter capped polyisocyanate-polyester based prepolymer). Capped as used in this context means that substantially all of the reactive groups of the polyisocyanate-polyester based prepolymer are reacted with a monofunctional polyalkylene glycols. The polyisocyanate-polyester polyol polyurethane prepolymer before capping contains terminal isocyanate moieties derived from the one or more polyisocyanates. The capped polyisocyanate-polyester based prepolymer can be prepared using one or more polyester polyols or it may be prepared using a combination of one or more polyesters polyols and one or more other polyols. Preferably, the polyester polyol is present in the capped polyisocyanate-polyester based prepolymer in an amount of about 30 percent by weight or greater based on the weight of the capped prepolymer and more preferably about 50 percent by weight or greater. Preferably, the polyester polyol is present in the capped polyisocyanate-polyester based prepolymer in an amount of about 90 percent by weight or less based on the weight of the prepolymer and more preferably about 80 percent by weight or less, most preferably about 75 percent by weight or less. The capped polyisocyanate-polyester based polyurethane prepolymer has a number average molecular weight such that it has the appropriate melting point and crystallization point to function as described herein. Preferably, the number average molecular weight is about 2,000 Daltons or greater, more preferably about 3,500 Daltons or greater and most preferably about 5,000 Daltons or greater. Preferably, the number average molecular weight is about 15,000 Daltons or less, more preferably about 10,000 Daltons or less and most preferably about 9,000 Daltons or less.

The polyester polyol can be any polyester polyol composition that meets the property requirements defined which is crystalline at ambient temperatures and melts in the desired temperature range. Preferred polyester polyols are prepared from linear diacids and linear diols. More preferred diacids are saturated linear $C_6$-$C_{12}$ diacids. More preferred diols are the $C_{2-6}$ diols, with butane diols, pentane diols and hexane diols being most preferred. Preferred polyester polyols are available from Degussa under the trade name Dynacoll and the designations 7360, 7380 and 7381, with 7381 more preferred.

The monofunctional polyalkylene glycol has a reactive active hydrogen on one end of its chain and an inert unreactive moiety on the other end. The active hydrogen moiety is preferably a primary or secondary amine or a hydroxyl, and more preferably a hydroxyl. The inert moiety can be any moiety which does not react with active hydrogen moieties or isocyanates, such as hydrocarbyloxy, and preferably alkoxy, aryloxy, alkylaryloxy and the like. Preferably, the inert moiety is an alkoxy. More preferably $C_{1-2}$ alkoxy, even more preferably $C_{1-6}$ alkoxy and most preferably $C_{1-4}$ alkoxy. In one embodiment the polyalkylene glycol is a monofunctional hydroxyl substituted hydrocarbon initiated polyalkylene glycol which comprises at one terminal end a hydrocarbyloxy moiety and at the other end an active hydrogen group. In between the terminal groups are a plurality of alkylene oxide moieties. Alternatively the compound can be referred to as a monofunctional hydrocarbyloxy polyalkyleneoxy glycol. The alkylene oxide moieties preferably comprise ethylene oxide moieties, propylene oxide moieties, butylene oxide moieties or a mixture thereof, with ethylene oxide moieties, propylene oxide moieties or a mixture thereof being preferred. The monofunctional polyalkylene glycol used has a number average molecular weight such that the capped polyisocyanate-polyester polyol polyurethane prepolymer is miscible with the isocyanate functional polyether prepolymer when the capped polyisocyanate polyester polyol polyurethane prepolymer is in the low viscous state (liquid state or molten state). Preferably, the number average molecular weight of the polyalkylene glycol is about 200 or greater and more preferably about 500 or greater. Preferably, the number average molecular weight of the polyalkylene glycol is about 2,000 or less and more preferably about 1,000 or less.

The capped polyisocyanate-polyester based polyurethane prepolymer can be prepared using the processes and isocyanates described hereinbefore. More particularly, the one or more polyester polyols are reacted with an excess of one or more polyisocyanates to form an isocyanate terminated polyester based prepolymer. This step is preferably performed in an inert atmosphere, that is, under nitrogen or argon, or in a vacuum. The components are reacted at a temperature of about 60° C. to about 100° C., and preferably from about 70° C. to about 80° C. The reaction may be performed in the presence of a typical catalyst which catalyzes the reaction of isocyanate moieties with active hydrogen containing compounds, although a catalyst is not necessary. Such catalysts are described elsewhere in this application. This step is performed for a sufficient time such the reaction of the polyesters polyols and polyisocyanates is complete. Preferably, the reaction is allowed to proceed for about 15 minutes to about 150 minutes and more preferably about 20 minutes to about 60 minutes. Thereafter, the isocyanate functional polyester polyol polyurethane prepolymer is reacted with a monofunctional polyalkylene glycol under conditions that substantially all of the isocyanate moieties of the isocyanate functional polyesterpolyol polyurethane prepolymer are capped with the polyalkylene glycol. An equivalent amount of the polyalkylene glycol as compared to the number of isocyanate moieties present is preferably used to insure that substantially all of the isocyanate moieties are capped. Preferably, little or no monofunctional polyalkyleneglycol is left. This step is preferably performed in an inert atmosphere that is under nitrogen or argon or in a vacuum. The components are reacted at a temperature of about 60° C. to about 100° C., and preferably from about 70° C. to about 80° C. The reaction may be performed in the presence of a typical catalyst which catalyzes the reaction of isocyanate moieties with active hydrogen containing compounds, although a catalyst is not necessary. This step is performed for a sufficient time such the reaction of the polyalkylene glycols and the isocyanate moieties is complete. Preferably, the reaction is allowed to proceed for about 15 minutes to about 150 minutes and more preferably about 20 minutes to about 60 minutes.

In another embodiment, the composition comprises one or more polyesters polyols which are capped with the residue of one or more monofunctional isocyanates (hereinafter isocyanate capped polyesters). Capped in this context means that the active hydrogen containing functional groups of the one or more polyester polyols are reacted with one or more monofunctional isocyanates. In this context substantially all of the active hydrogen containing functional moieties are reacted with the one or more monofunctional isocyanates. Residue as used in this context means the portion of the monofunctional isocyanate bonded to the polyester polyol after reaction of the components. The useful polyester polyols have been described hereinbefore. The monofunctional polyisocyanates useful in this invention include any which react with polyester polyols and which improve the miscibility of the polyester polyol with the isocyanate functional polyether polyol polyurethane prepolymers at temperatures wherein the isocyanate capped polyesters are in the liquid state (that is are molten). Preferred monofunctional isocyanates include isocyanato silanes, and hydrocarbyl sulfonyl isocyanates. Preferred hydrocarbyl sulfonyl isocyanates include aryl sulfonyl isocyanates and alkylaryl sulfonyl isocyanates and more preferably toluolsulfonyl isocyanate. Isocyanato silanes comprise one isocyanate moiety and one or more silane moieties. Preferably, the isocyanate and silane moieties are bonded to a hydrocarbylene backbone, and more preferably an alkylene moiety. Preferred isocyanato silanes include isocyanato hydrocarbyl silanes. More preferred isocyanato silanes include isocyanato alkyl silanes, with $C_{1-3}$ alkylene groups located between the isocyanate and silane moieties.

The isocyanate capped polyesters can be prepared by reacting a polyester polyols with an equivalent amount or an excess of one or more monofunctional isocyanates to form isocyanate capped polyester polyols. This step is preferably performed in an inert atmosphere, that is, under nitrogen or argon, or in a vacuum. The components are reacted at a temperature of about 60° C. to about 100° C., and preferably from about 70° C. to about 80° C. The reaction may be performed in the presence of a typical catalyst which catalyzes the reaction of isocyanate moieties with active hydrogen containing compounds, although a catalyst is not necessary. Such catalysts are described elsewhere in this application. This step is performed for a sufficient time such the reaction of the polyester polyol and monofunctional isocyanates is complete. Preferably, the reaction is allowed to proceed for about 10 minutes to about 90 minutes and more preferably about 20 minutes to about 60 minutes.

The capped polyester polyol polyurethane prepolymers or the isocyanate capped polyester polyols have melting points such that they provide sufficient green strength to the adhesive compositions of the invention to prevent the substrates from moving in relation to one another due to gravitational forces. In terms of installing a window in a vehicle or building, the adhesive composition prevents the window from sliding after installation. The capped polyester polyol polyurethane prepolymers or the isocyanate capped polyester polyols have melting points sufficient to provide the needed green strength. Preferably, they have a melting point of about 40° C. or greater, even more preferably about 50° C. or greater and most preferably about 60° C. or greater. Preferably, they exhibit a melting point of about 90° C. or less and most preferably about 70° C. or less. Preferably, the capped polyester polyol polyurethane prepolymers or the isocyanate capped polyester polyols are present in the adhesive composition in sufficient amount to give the needed green strength. The amount of the capped polyester polyol polyurethane prepolymers or the isocyanate capped polyester polyols is also chosen to be low enough such that they are miscible with the isocyanate functional prepolymer when the mixture is at a temperature at which they are in the low viscous (liquid state), that is from about 40° C. to about 80° C., and preferably about 60° C. to about 70° C. Miscible as used herein means that the mixture forms a single phase at the temperatures wherein the capped polyisocyanate-polyester polyol polyurethane prepolymers or isocyanate capped polyester polyols are in the low viscous (liquid state). Preferably, the capped polyester polyurethane polyol polyurethane prepolymers or the isocyanate capped polyester polyols are present in the adhesive composition in an amount of about 0.1 parts by weight or greater based on the weight of the adhesive composition, more preferably about 0.5 parts by weight of greater and most preferably about 0.7 parts by weight or greater. Preferably, polyester polyol polyurethane prepolymers or the isocyanate capped polyesters polyols are present in the adhesive in an amount of about 10 parts by weight or less based on the weight of the adhesive composition and more preferably about 3.7 parts by weight or less.

Optional components of the adhesive of the invention include reinforcing fillers. Such fillers are well known to those skilled in the art and include carbon black, titanium dioxide, calcium carbonate, surface treated silicas, titanium oxide, fume silica, talc, and the like. Preferred reinforcing fillers comprise carbon black as described hereinbefore. In one embodiment, more than one reinforcing filler may be used, of which one is carbon black and a sufficient amount of carbon black is used to provide the desired black color to the adhesive. The reinforcing fillers are used in sufficient amount to increase the strength of the adhesive and to provide thixotropic properties to the adhesive. The composition of the invention also preferably comprises carbon black to give the composition the desired black color, rheology and sag resistance. The amount of carbon black in the composition is that amount which provides the desired color, rheology and sag resistance. The carbon black is preferably used in the amount of about 10 parts by weight or greater based on the weight of the composition, more preferably about 15 parts by weight or greater and most preferably about 20 parts by weight or greater. The carbon black is preferably present in an amount of about 35 parts by weight or less based on the weight of the composition, more preferably about 30 parts by weight or less and most preferably about 25 parts by weight or less.

The adhesive also contains a catalyst which catalyzes the reaction of isocyanate moieties with water or an active hydrogen containing compound. The catalyst can be any catalyst known to the skilled artisan for the reaction of isocyanate moieties with water or active hydrogen containing compounds. Among preferred catalysts are organotin compounds, metal alkanoates, and tertiary amines. Included in the useful organotin catalysts are compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. The dialkyltin dicarboxylate preferably corresponds to the formula $(R^1OC(O))_2$—Sn—$(R^1)_2$ wherein $R^1$ is independently in each occurrence a $C_{1-10}$ alkyl, preferably a $C_{1-3}$ alkyl and most preferably a methyl. Dialkyltin dicarboxylates with lower total carbon atoms are preferred as they are more active catalysts in the compositions used in the invention. The preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. The organotin or metal alkanoate catalyst is present in an amount of about 60 parts per million or greater based on the weight of the adhesive more preferably 120 parts by million or greater. The organotin or metal alkanoate catalyst is present in an amount of about 1.0 part by weight or less based on the weight of the adhesive, more preferably about 0.5 parts by weight or less and most preferably about 0.1 parts by weight or less.

Among preferred tertiary amines are dimorpholinodialkyl ether, a di((dialkylmorpholino)alkyl)ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine, and mixtures thereof. More preferred tertiary amines include dimorpholinodiethyl ether or (di-(2-(3,5-dimethyl-morpholino)ethyl)ether). Tertiary amines are preferably employed in an amount, based on the weight of the adhesive, of about 0.01 parts by weight or greater based on the adhesive, more preferably about 0.05 parts by weight or greater, even more preferably about 0.1 parts by weight or greater and most preferably about 0.2 parts by weight or greater and about 2.0 parts by weight or less, more preferably about 1.75 parts by weight or less, even more preferably about 1.0 parts by weight or less and most preferably about 0.4 parts by weight or less.

The adhesive of the invention may be formulated with fillers and additives known in the prior art for use in adhesive compositions. By the addition of such materials physical properties such as rheology, flow rates and the like can be modified. However, to prevent premature hydrolysis of the moisture sensitive groups of the prepolymers, fillers should be thoroughly dried before admixture therewith.

Among optional materials in the adhesive composition are clays. Preferred clays useful in the invention include kaolin, surface treated kaolin, calcined kaolin, aluminum silicates and surface treated anhydrous aluminum silicates. The clays can be used in any form, which facilitates formulation of a pumpable adhesive. Preferably, the clay is in the form of pulverized powder, spray-dried beads or finely ground particles. Clays may be used in an amount of about 0 parts by weight of the adhesive composition or greater, more preferably about 5 part by weight or greater and even more preferably about 10 parts by weight or greater. Preferably, the clays are used in an amount of about 35 parts by weight or less of the adhesive composition and more preferably about 20 parts by weight or less.

The adhesive composition of this invention may further comprise plasticizers so as to modify the rheological properties to a desired consistency. Such materials should be free of water, inert to isocyanate groups and compatible with a polymer. Suitable plasticizers are well known in the art and preferable plasticizers include alkyl phthalates such as diisononylphthalate or diisodecylphthalate, partially hydrogenated terpene, trioctyl phosphate, toluene-sulfamide, esters of alkylsulfonic acid, adipic acid esters, castor oil, toluene and alkyl naphthalenes. The amount of plasticizer in the adhesive composition is that amount which gives the desired rheological properties. The amounts disclosed herein include those amounts added during preparation of the prepolymer and during compounding of the adhesive. Preferably, plasticizers are used in the adhesive composition in an amount of about 0 parts by weight or greater based on the weight of the adhesive composition, more preferably about 5 parts by weight or greater and most preferably about 10 parts by weight or greater. The plasticizer is preferably used in an amount of about 45 parts by weight or less based on the total amount of the adhesive composition and more preferably about 40 parts by weight or less.

The composition of this invention may further comprise stabilizers, which function to protect the adhesive composition from moisture, thereby inhibiting advancement and preventing premature crosslinking of the isocyanates in the adhesive formulation. Stabilizers known to the skilled artisan for moisture curing adhesives may be used preferably herein. Included among such stabilizers are diethylmalonate, alkylphenol alkylates, paratoluene sulfonic isocyanates, benzoyl chloride and orthoalkyl formates. Such stabilizers are preferably used in an amount of about 0.1 parts by weight or greater based on the total weight of the adhesive composition, preferably about 0.5 parts by weight or greater and more preferably about 0.8 parts by weight or greater. Such stabilizers are used in an amount of about 5.0 parts by weight or less based on the weight of the adhesive composition, more preferably about 2.0 parts by weight or less and most preferably about 1.4 parts by weight or less.

The composition of this invention may further comprise an adhesion promoter, such as those disclosed in Mahdi, U.S. Patent Publication 2002/0100550 paragraphs 0055 to 0065 and Hsieh, U.S. Pat. No. 6,015,475 column 5, line 27 to column 6, line 41 incorporated herein by reference. The amounts of such adhesion promoters useful are also disclosed in these references and incorporated herein by reference.

The adhesive composition may further comprise a hydrophilic material that functions to draw atmospheric moisture into the composition. This material enhances the cure speed of the formulation by drawing atmospheric moisture to the composition. Preferably, the hydrophilic material is a liquid. Among preferred hydroscopic materials are pyrrolidones such as 1 methyl-2-pyrrolidone (or N-methyl pyrrolidone). The hydrophilic material is preferably present in an amount of about 0.1 parts by weight or greater and more preferably about 0.3 parts by weight or greater and preferably about 1.0 parts by weight or less and most preferably about 0.6 parts by weight or less. Optionally the adhesive composition may further comprise a thixotrope (rheological additive). Such thixotropes are well known to those skilled in the art and include alumina, limestone, talc, fumed silica, calcium carbonate, perlite, cyclodextrin and the like. The thixotrope may be added to the adhesive of composition in a sufficient amount to give the desired rheological properties. Preferably, the thixotrope is present in an amount of about 0 parts by weight or greater based on the weight of the adhesive composition, preferably about 1 part by weight or greater. Preferably, the optional thixotrope is present in an amount of about 10 parts by weight or less based on the weight of the adhesive composition and more preferably about 2 parts by weight or less.

Other components commonly used in adhesive compositions may be used in the adhesive composition of this invention. Such materials are well known to those skilled in the art and may include ultraviolet stabilizers and antioxidants and the like. As used herein all parts by weight relative to the components of the adhesive composition are based on 100 total parts by weight of the adhesive composition.

The adhesive composition of this invention may be formulated by blending the components together using means well known in the art. Generally, the components are blended in a suitable mixer. Such blending is preferably conducted in an inert atmosphere in the absence of oxygen and atmospheric moisture to prevent premature reaction. It may be advantageous to add plasticizers to the reaction mixture for preparing the isocyanate functional polyether polyurethane prepolymers, the capped polyester polyol polyurethane prepolymers and the isocyanate capped polyesters polyols so that such mixtures may be easily mixed and handled. Alternatively, the plasticizers can be added during blending of all the components. The ingredients are blended at a temperature wherein the polyester polyol polyurethane prepolymers and the isocyanate capped polyesters polyols are liquid (in a low viscous state). Preferably, the components are blended at a temperature of about 50° C. to about 90° C., more preferably about 60° C. to about 80° C. Preferably, the materials are blended under vacuum or an inert gas, such as nitrogen or argon. The ingredients are blended for a sufficient time to prepare a well blended mixture, preferably from about 10 to about 60 minutes. Once the adhesive composition is formulated, it is packaged in a suitable container such that it is protected from atmospheric moisture and oxygen. Contact with atmospheric moisture and oxygen could result in premature crosslinking of the polyurethane prepolymer-containing isocyanate groups.

The adhesive composition of the invention is used to bond a variety of substrates together as described hereinbefore. The composition can be used to bond porous and nonporous substrates together. The adhesive composition is applied to a substrate and the adhesive on the first substrate is thereafter contacted with a second substrate. In preferred embodiments, the surfaces to which the adhesive is applied are cleaned and in case activated and/or primed prior to application, see for example, U.S. Pat. Nos. 4,525,511; 3,707,521 and 3,779,794, relevant parts of all are incorporated herein by reference. Generally the adhesives of the invention are applied at temperature at which the composition can be pumped and at which the prepolymers in the composition are a low viscous paste (liquid state). Preferably, the adhesive composition of the invention is heated to a temperature of about 50° C. or greater for application, more preferably a temperature of about 60° C. or greater. Preferably, the adhesive composition of the invention is heated to a temperature of about 90° C. or less for application, more preferably a temperature of about 70° C. or less. The adhesive composition cures in the presence of atmospheric moisture. Exposure to atmospheric moisture is sufficient to result in curing of the adhesive. Curing can be accelerated by the addition of additional water or by applying heat to the curing adhesive by means of convection heat, microwave heating and the like. Preferably, the adhesive of the invention is formulated to provide an open time of at least about 3 minutes or greater more preferably about 5 minutes or greater. "Open time" is understood to mean the time after application of the adhesive to a first substrate until it starts to become a high viscous paste and is not subject to deformation during assembly to conform to the shape of the second substrate and to adhere to it.

The adhesive composition is preferably used to bond glass to other substrates such as metal or plastics. In a preferred embodiment the first substrate is a glass window and the second substrate is a window frame. In another preferred embodiment the first substrate is a glass window and the second substrate is a window frame of an automobile. Preferably, the glass window is cleaned and may have a glass wipe or primer applied to the area to which the adhesive is to be bonded. The window flange may be primed with a paint primer. The adhesive is applied in a bead to the periphery of the window located such that it will contact the window flange when placed in the vehicle. The window with the adhesive located thereon is then placed into the flange with the adhesive located between the window and the flange. The adhesive bead is a continuous bead that functions to seal the junction between the window and the window flange. A continuous bead of adhesive is a bead that is located such that the bead connects at each end to form a continuous seal between the window and the flange when contacted. Thereafter the adhesive is allowed to cure. The adhesive of the invention has sufficient green strength to prevent movement of the window at less than 1 min, more preferably at less than 20 seconds after it is assembled.

In another embodiment the compositions of the invention can be used to bond modular components to a car body or to each other. Examples of modular components include vehicle modules, such as door, window or body.

Molecular weights as described herein are number average molecular weights which may be determined by Gel Permeation Chromatography (also referred to as SEC). For polyurethane prepolymers, it is also possible to calculate approximate number average molecular weight from the equivalent ratio of the isocyanate compounds and of the polyol compounds with which they are reacted as known to the persons skilled in the art.

ILLUSTRATIVE EMBODIMENTS OF THE INVENTION

The following examples are provided to illustrate the invention, but are not intended to limit the scope thereof. All parts and percentages are by weight unless otherwise indicated.

Example 1

Preparation of the Polyether Based Prepolymer (a)

100 g of molten pure 4,4'-Diphenylmethane diisocyanate are weighed into a lab reactor at a temperature of 50° C., 250 g of a polyoxypropylene ether diol MW 2000 and 310 g of an ethylene oxide capped polyoxypropylene ether triol MW 4500 are added and catalyzed with 4 g of a 0.5 percent tin-octoate solution in Di-isononyl phthalate. The reactor is kept at 70° C. for 1 hour, then 340 g Di-isononyl phthalate are added.

Example 2

Preparation of Adduct 1 (b1)

81 g of molten pure 4,4'-Diphenylmethane diisocyanate are weighed into a lab reactor at a temperature of 50° C., then 131 g Di-isononyl phthalate (50° C.) and 538 g of molten DYNACOLL™ 7381 linear copolyester diol available from Degussa (70° C.) are added. The reactor is kept at 70° C. for 1 hour. 250 g polypropylene glycol n-butyl ether available under the trademark and designation Synalox 100-20B from The Dow Chemical Company are added and the reactor is kept at 70° C. for 1 hour. A blend of 4 percent Adduct 1 and 96 percent prepolymer (a) is, at 23° C., a non-flowing, solid waxy paste. At 70° C. up to 10 percent Adduct 1 are miscible with prepolymer (a).

Example 3

Preparation of Adduct 2 (b2)

742.5 g of molten DYNACOLL™ 7381 linear copolyester diol weighed is into a lab reactor at a temperature 70° C., then 175 g Di-isononyl phthalate (60° C.) and 82.5 g of p-toluolsulfonyl isocyanate are added. The reactor is kept at 70° C. for 1 hour.

A blend of 3 percent Adduct 2 and 97 percent prepolymer (a) is, at 23° C., a non flowing, solid waxy paste. At 70° C. greater than (>) 20 percent Adduct 2 are miscible with prepolymer (a).

Example 4

Preparation of Adhesive 1 (Comparative)

2270 g of Prepolymer (a), 875 g of carbon black, 350 g of calcined china clay and 5.3 g of glycol acid salt of triethylene diamine and 1,1-dibutyltin diacetate (available from Air products under the trademark and designation Dabco DC 2) are blended in a planetary blender under vacuum at 60° C. for 1 hour. The obtained sag resistant paste is filled into water vapor proof cartridges. Properties of the adhesive are given in the table below.

Example 5

Preparation of Adhesive 2

2172 g of Prepolymer (a), 875 g of carbon black, 350 g of calcined china clay, 98 g of Adduct 1 and 5.3 g of glycol acid salt of triethylene diamine and 1,1-dibutyltin diacetate (available from Air Products under the trademark and designation Dabco DC 2) are blended in a planetary blender under vacuum at 70° C. for 1 hour. The obtained sag resistant paste is filled into water vapor proof cartridges. DYNACOLL™ 7381 linear copolyester diol content in the adhesive is 1.5 percent. Properties of the adhesive are given in the table below.

Example 6

Preparation of Adhesive 3

2196 g of Prepolymer (a), 875 g of carbon black, 350 g of calcined china clay, 73.5 g of Adduct 2 and 5.3 g of glycol acid salt of triethylene diamine and 1,1-dibutyltin diacetate (available from Air Products under the trademark and designation Dabco DC 2) are blended in a planetary blender under vacuum at 70° C. for 1 hour. The obtained sag resistant paste is filled into water vapor proof cartridges. DYNACOLL™ 7381 linear copolyester diol content in the adhesive is 1.5 percent. Properties of the adhesive are given in the table below.

Sag Test with Static Load

A lap shear sample is prepared with two aluminum specimens 100×20×5 mm having a 6 mm hole at one side. On the overlap area 20×20 mm of the specimen a primer is applied. The lap shear sample is prepared with the adhesive having an overlap of 20×20×5 mm. 1 and 5 minutes after the start of the application the sample is hooked to a lab stand and a weight of 500 g is attached to the other end of the sample. After 12 hours, the sag is determined by measuring the total length of the sample and subtracting the original length. The static load corresponds to a stress of 0.0125 N/mm2, which is about 5 times the stress, a larger car front screen would exert.

Glass Screen Sliding Test

The test apparatus consists of a) a glass plate with an additional metal weight to give a total weight of 4200 g and b) an aluminum plate 350×350 mm with a dead stop at the upper end. The plate can be fixed to a stand in vertical position. An adhesive bead 10 mm base and 10 mm height is applied 25 mm from the edge onto the glass so that the total length is 1200 mm The glass plate is transferred in horizontal position to the aluminum plate and pressed to a rest height of 5 mm (with the help of 4 spacers). The assembly is brought into vertical position and the sag is observed measured. The load corresponds to a stress of 0.0035 N/mm2, which is about double the stress, a larger car front screen would exert.

Properties of the sealants

| | Example 4 Sealant 1 Reference | Example 5 Sealant 2 | Example 6 Sealant 3 |
|---|---|---|---|
| Properties of uncured sealant | | | |
| Viscosity, extrusion 4 bar/4 mm nozzle at 55° C. | 55 | 61 | 95 |
| Sag, triangular bead 4 mm base 20 mm height on vertical wall, sag in ° | 0 | 0 | 0 |
| Open time, min | 30 | 16 | 12.5 |
| Cure rate, 23° C./50% r.h., 48 h, mm | 5 | 5.2 | 3.2 |
| Static load test, 1 min *), mm | falls | 2.2 | 1.7 |
| Static load test, 5 min *), mm (lap shear 20 × 20 × 5 mm, 500 g) | falls | 0.3 | 0.5 |
| Glass screen sliding test, 0.5 min **), mm (Bead 1200 × 10 × 5 mm, 4200 g) | slides, falls | 0.3 | 0.2 |
| Properties of cured sealant | | | |
| Tensile strength (DIN 53504), N/mm$^2$ | 9.5 | 8 | 8.3 |
| Elongation (DIN 53504), % | 695 | 790 | 675 |
| Tear strength (DIN 53515), N/mm | 15.5 | 20.6 | 21.3 |
| Lap shear strength (EN 1465), 7d | 6.5 | 6.4 | 6.0 |
| G-modulus, at 10% strain, N/mm$^2$ | 1.3 | 2.2 | 2.5 |

What is claimed is:

1. A composition comprising
   a) one or more isocyanate functional polyether polyurethane prepolymers; and
   b) from about 0.1 to about 10 parts by weight of one or more polyester polyols which are capped with the residue of one or more monofunctional isocyanates; wherein the composition is a low viscous paste having a viscosity of less than 10,000 Pa s at temperature of from about 40 to about 80° C. and is a high viscous paste having a viscosity of greater than 50,000 Pa s at a temperature of below about 40° C.; wherein the total parts by weight of the composition is 100.

2. A composition according to claim 1 wherein the composition further comprises c) one or more catalysts for the reaction of isocyanate moieties with hydroxyl groups.

3. A composition according to claim 1 wherein the residue of the one or more monofunctional isocyanates comprises the residue of one or more isocyanto hydrocarbyl silanes or aryl or alkaryl sulfonyl isocyanates.

4. A composition according to claim 3 wherein the residue of the one or more monofunctional isocyanates comprise the residue of one or more aryl or alkaryl sulfonyl isocyanates.

5. A composition according to claim 2 wherein component b) further comprises one or more polyester polyols wherein the terminal groups on the polyisocyanate-polyester polyol polyurethane prepolymer are the residue of a monofunctional polyalkylene glycol.

6. A composition according to claim 5 wherein the polyalkylene glycol is $C_{1-12}$ monofunctional alcohol initiated polyalkylene oxide chain wherein the polyalkylene oxide chain comprises units of ethyleneoxy, propyleneoxy, butyleneoxy or a mixture thereof.

7. A composition according to claim 6 wherein the monofunctional polyalkylene oxide has a molecular weight of about 500 to about 2,000.

8. A composition according to claim 7 which further comprises one or more fillers.

9. A composition according to claim 8 wherein the one or more fillers is one or more species of carbon black.

10. A composition according to claim 9 wherein:
   a) the one or more isocyanate functional polyether based polyurethane prepolymers are present in an amount of about 40 to about 70 parts by weight;
   b) the one or more isocyanate capped polyesters are present in an amount of about 0.5 to about 10 parts by weight;
   c) one or more catalysts for the reaction of isocyanate moieties with hydroxyl groups are present in an amount of about 0.005 to about 2 parts by weight; and
   d) one or more species of carbon black are present in an amount of about 5 to about 35 parts by weight;
   wherein the total parts by weight of the composition is 100.

11. A composition according to claim 10 wherein the composition bonds to glass and to coated substrates.

12. A composition according to claim 10 wherein the composition is a low viscous paste at temperature of from about 45 to about 70° C. and is a high viscous paste at a temperature of about 35° C. or below.

13. A method of bonding two or more substrates together which comprises contacting the two or more substrates together with a composition according to claim 2 disposed along at least a portion of the area wherein the substrates are in contact wherein the composition is in the low viscous state.

14. A method according to according to claim 13 wherein the composition is heated to about 50 to about 90° C. prior to contacting it with the one or more substrates.

15. The method of claim 13 wherein the at least one of the substrates is window glass.

16. The method of claim 15 wherein at least one of the other substrates is a building or a vehicle.

17. The method of claim 15 wherein the substrate is a vehicle.

18. A method according to claim 13 wherein:
   a) the one or more isocyanate functional polyether polyol polyurethane prepolymers are present in an amount of about 40 to about 70 parts by weight;
   b) one or more isocyanate capped polyesters polyols are present in an amount of about 0.5 to about 10 parts by weight;
   c) one or more catalysts for the reaction of isocyanate moieties with hydroxyl groups are present in an amount of about 0.005 to about 2 parts by weight; and
   d) one or more species of carbon black are present in an amount of about 5 to about 35 parts by weight;
   wherein the total parts by weight of the composition is 100.

* * * * *